No. 692,491. Patented Feb. 4, 1902.
A., G. & J. STELL.
DOFFING APPARATUS FOR SPINNING MACHINERY.
(Application filed Apr. 8, 1901.)
(No Model.) 6 Sheets—Sheet 1.
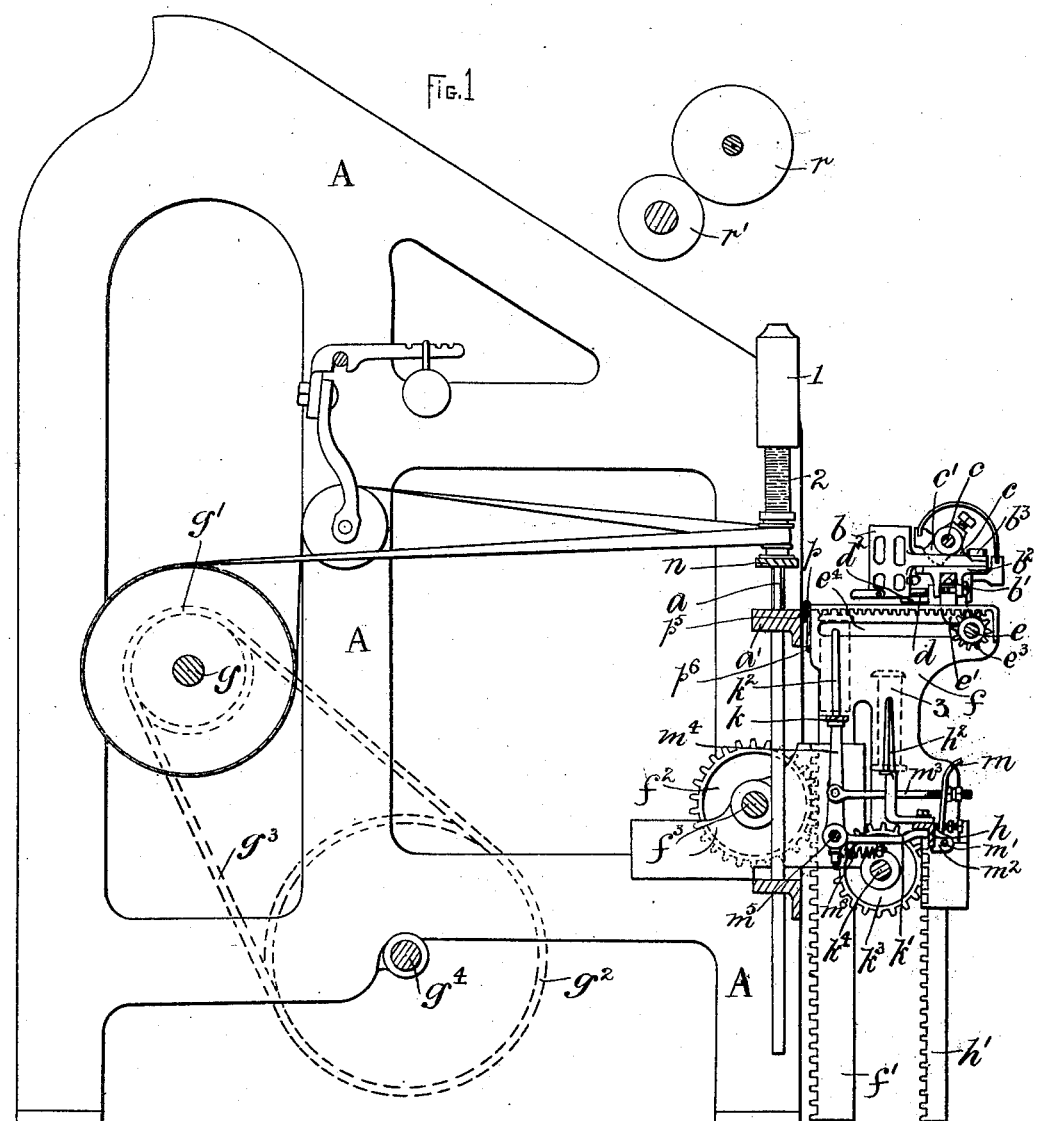

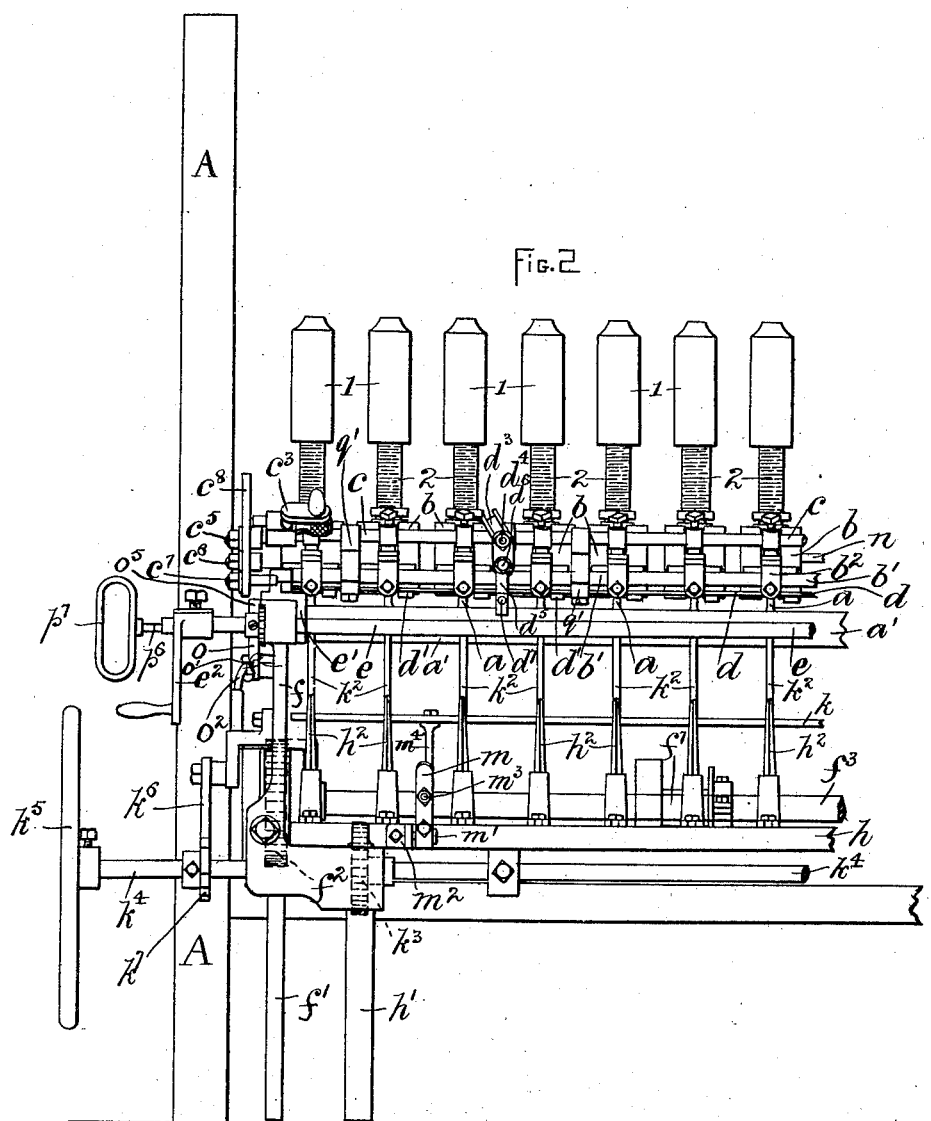

No. 692,491. Patented Feb. 4, 1902.
A., G. & J. STELL.
DOFFING APPARATUS FOR SPINNING MACHINERY.
(Application filed Apr. 8, 1901.)
(No Model.) 6 Sheets—Sheet 3.
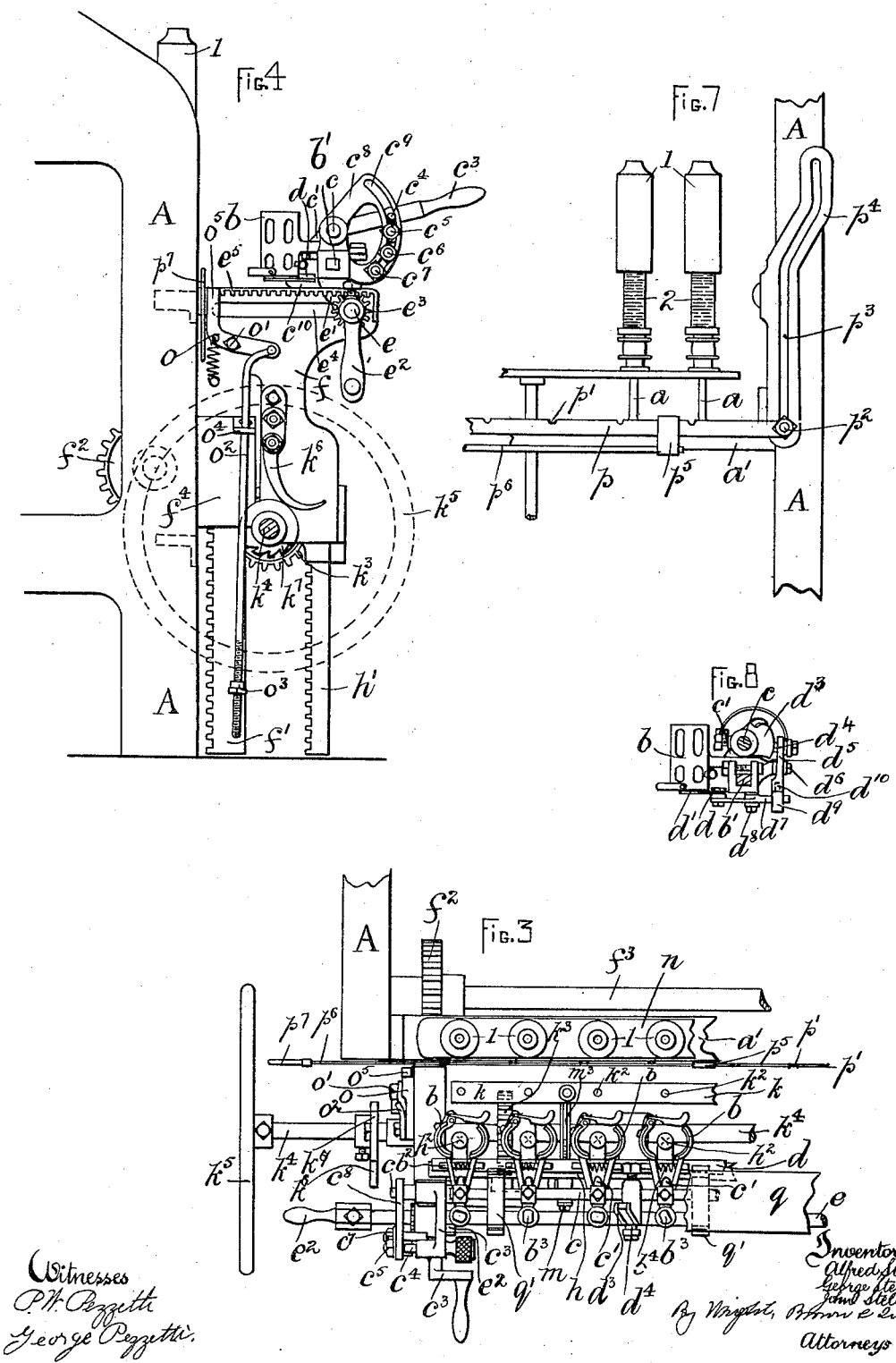

No. 692,491. Patented Feb. 4, 1902.
A., G. & J. STELL.
DOFFING APPARATUS FOR SPINNING MACHINERY.
(Application filed Apr. 8, 1901.)
(No Model.) 6 Sheets—Sheet 4.
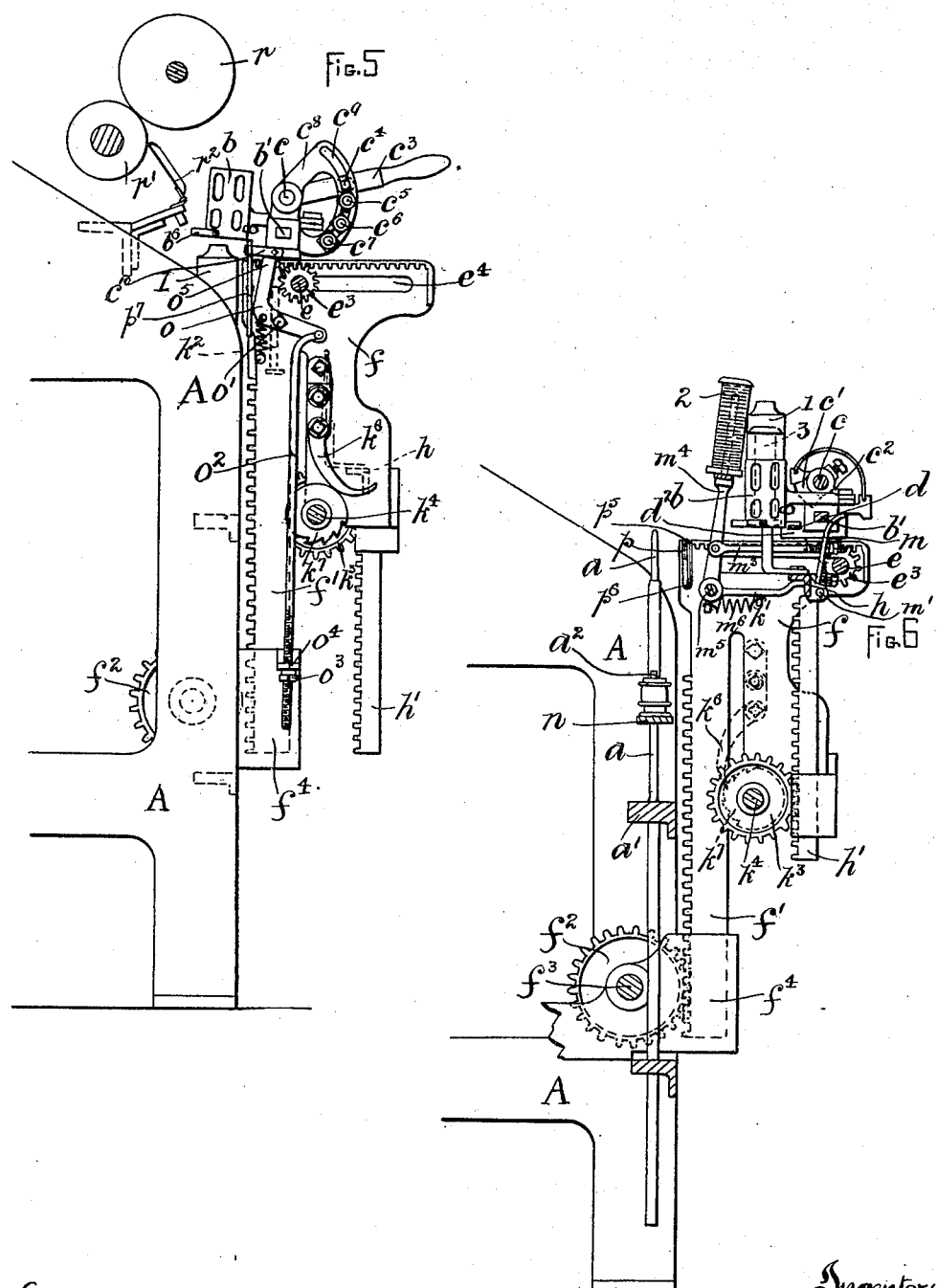
Witnesses
P. W. Pezzetti
George Pezzetti
Inventors
Alfred Stell
George Stell
John Stell
By Wright, Brown & Quinby
Attorneys

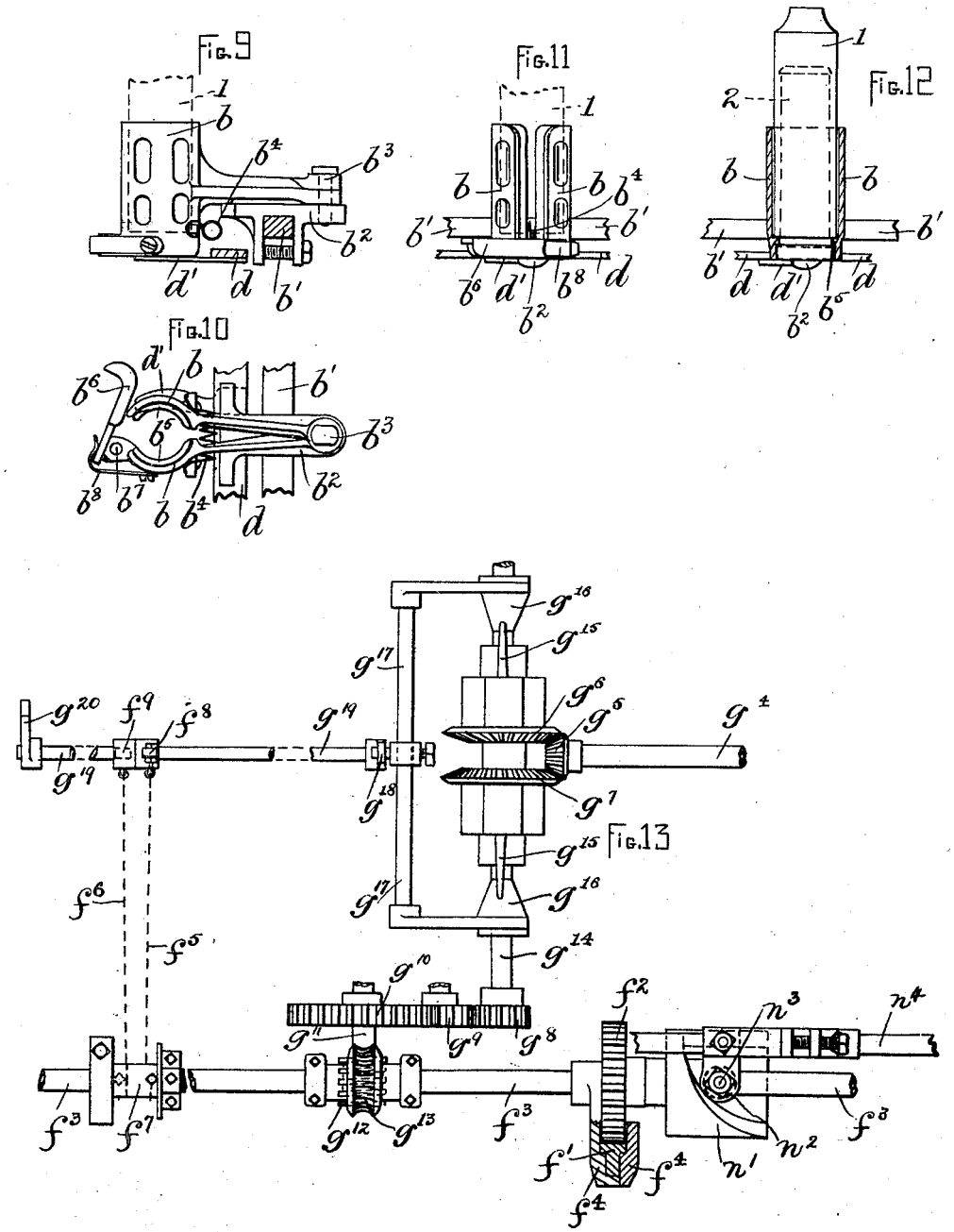

UNITED STATES PATENT OFFICE.

ALFRED STELL AND GEORGE STELL, OF STEETON, AND JOHN STELL, OF KEIGHLEY, ENGLAND.

DOFFING APPARATUS FOR SPINNING MACHINERY.

SPECIFICATION forming part of Letters Patent No. 692,491, dated February 4, 1902.

Application filed April 8, 1901. Serial No. 54,893. (No model.)

*To all whom it may concern:*

Be it known that we, ALFRED STELL and GEORGE STELL, residents of Station road, Steeton, near Keighley, and JOHN STELL, a resident of 3 Victoria Park View, Keighley, in the county of York, England, subjects of the King of Great Britain, have invented certain new and useful Improvements in Doffing Apparatus for Spinning and Like Machinery, of which the following is a specification.

Our invention relates to improvements in "doffing" apparatus for spinning, doubling, and twisting machinery used in the production of yarns or threads, and more particularly for the class known as "cap spinning and twisting" machinery; and it consists in so constructing said means or apparatus that the process of doffing is considerably facilitated. To attain this object, we make use of the apparatus constructed and arranged to operate as hereinafter described and as illustrated in the accompanying sheets of drawings, in which—

Figure 14:
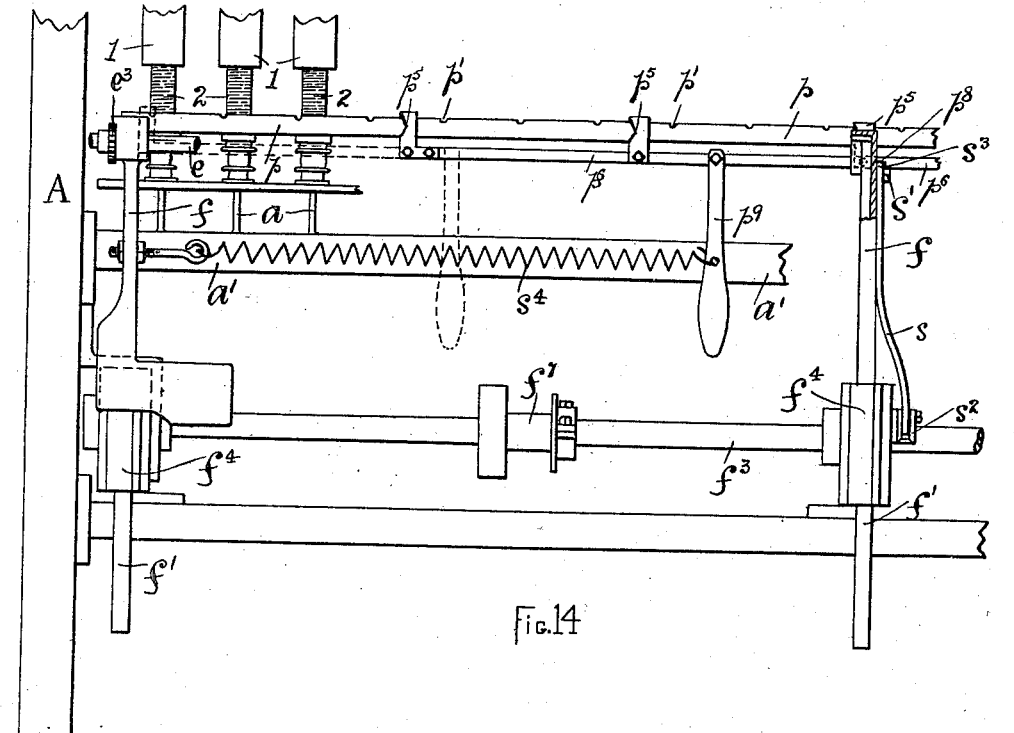
Figure 15:
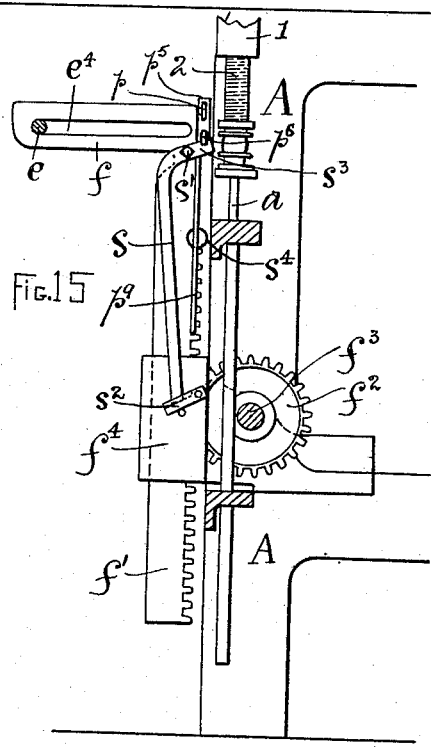

Figure 1 is a sectional end elevation of our improved doffing apparatus, showing same mounted upon or in connection with a cap spinning or twisting machine. Figs. 2 and 3 are front elevation and plan, respectively, of parts illustrated by Fig. 1. Figs. 4 and 5 are end elevations of our improved doffing apparatus, showing its several parts in different relative positions. Fig. 6 is a sectional end elevation of said apparatus, showing certain of the parts of same in other different positions. Fig. 7 is a front elevation of a portion of the mechanism for cutting or severing the yarns or threads and parts in connection therewith. Fig. 8 is a sectional end elevation of the parts through which the series of fingers upon which rest the bobbins within the clips, hereinafter referred to, are operated. Figs. 9 and 10 are side elevation and plan, respectively, of the clip above referred to and parts in connection therewith. Figs. 11 and 12 are front and sectional front elevations, respectively, of parts illustrated by Figs. 9 and 10, Fig. 12 also showing the cap and bobbin resting within the clip, as hereinafter described. Fig. 13 is a plan of the mechanism for operating the "lifter-rail" at the time and in the manner hereinafter described. Figs. 14 and 15 are front and end elevations of a sufficient portion of our improved apparatus as will illustrate the mounting and operating of the yarn-severing mechanism hereinafter described.

Similar characters of reference indicate similar parts throughout the several views.

A indicates the framework of the machine.

In carrying our invention into effect we mount the spindles $a$ on a fixed rail $a'$ in the ordinary manner. Upon the horizontal bar or rod $b'$, extending throughout the whole length of the frame, we secure the supports $b^2$, upon which are hinged at $b^3$ the series of clips $b$, which may be operated against the retractive actions of their springs $b^4$ by the lever-arms $c'$, the surfaces of which are preferably cam-shaped. The lever-arms $c'$ are mounted on the shaft $c$, which is carried by the supports $c^2$, projecting from the rod $b'$, and the positions of these levers $c'$ may be altered, so as to cause the jaws of the clips to be held at any appropriate distance apart, by means of the lever $c^3$, which is provided with a spring projecting pin $c^4$ for contact with the studs $c^5$ $c^6$ $c^7$, mounted upon the plate $c^8$ and adjustable along the slot $c^9$. Sliding in bearings $d^2$, carried by the bar $b'$, is a rod $d$, upon which are mounted a series of fingers or projections $d'$ to take beneath the clips $b$ in order to support the bobbins, as hereinafter described. The rod $d$ is moved laterally whenever the shaft $c$ is rotated by its lever $c^3$ by means of the cam $d^3$, (acting upon the stud $d^4$,) the lever $d^5$, fulcrumed at $d^6$, and the lever $d^7$, which has its pivot at $d^8$. The lower part $d^9$ of the lever $d^5$ is capable of a certain amount of rotation by its pin $d^{10}$, taking within an opening formed in the other part of said lever. The parts hereinbefore described are supported upon brackets $e'$, carried by the shaft $e$, which is rotated by the hand-lever $e^2$ and is capable of movement in a horizontal direction in the slot $e^4$ by means of its pinions $e^3$, gearing with the racks $e^5$, mounted upon the supports $f$. The clips $b$ are further provided with flanges $b^5$, upon which rest the caps 1, as hereinafter described.

In order that the clips $b'$ may be moved into the proper position, so as to receive the caps 1 and bobbins 2, the supports $f$, carrying the rod $b$, upon which they are mounted, is raised and lowered by means of the racks $f'$, gearing with the wheels $f^2$, mounted upon the shaft $f^3$. The latter derives its motion from the driving-shaft $g$ through the chain-wheels $g'$ $g^2$, chain $g^3$, shaft $g^4$, bevel-pinion $g^5$, reversing-gears $g^6$ $g^7$, shaft $g^{14}$, gear-wheels $g^8$, $g^9$, and $g^{10}$, shaft $g^{11}$, worm $g^{12}$, and worm-wheel $g^{13}$. The gears $g^6$ $g^7$ are coupled to or thrown out of gear with the shaft $g^{14}$ through the well-known levers or catches $g^{15}$ being moved by the cones $g^{16}$, and the latter are operated by the rod $g^{17}$, which is moved into its several positions by the lever-arm $g^{18}$, mounted on the shaft $g^{19}$, which is oscillated by the hand-lever $g^{20}$, so that either one or other of the gears $g^6$ $g^7$ may drive the shaft $g^{14}$ or they may both run idly. The supports $f$ are arranged to take through guides $f^4$, and their motion is limited in each direction by means of the chains $f^5$ $f^6$, which take over and are fixed to the barrel $f^7$ and are so arranged that one of them is wound around the drum at the time that the other is being unwound therefrom. In this manner one of them operates the rock-shaft in one direction through the radially-disposed lever $f^8$ or $f^9$ at the extremity of the upward movement of the supports $f$ to throw the shaft $g^{14}$ out of gear with its wheel $g^6$ or $g^7$ and the other at the end of the downward movement thereof in a similar manner.

Mounted upon the bar $h$, which is carried by the racks $h$, are a series of pegs or projections $h^2$ for receiving the empty bobbins 3 to be transferred to the spindles $a$ in place of the full bobbins 2. These latter are deposited, in the manner hereinafter described, upon the pegs $k^2$ on the bar $k$, which is connected to the bar $h$ by means of the levers $m^4$ and brackets $k'$. The bars $h$ and $k$ are movable in a vertical direction irrespective of the movement due to the supports $f$ by means of the toothed wheels $k^3$, which are carried by the shaft $k^4$, mounted in bearings on said supports $f$, gearing with the racks $h'$. The shaft $k^4$ is rotated by the hand-wheel $k^5$. In order to cause the pegs $k^2$ to be moved forward when they are raised, as shown by Fig. 6, the levers $m$, which are fulcrumed at $m'$ in bearings $m^2$, are arranged to come into contact with the bar $b'$ and so move the levers $m^4$, upon which the bar $k$ is mounted, about their fulcrums $m^5$. The levers $m^4$ are returned to their normal positions on being lowered by the springs $m^6$.

The actions of the apparatus are as follows: Taking it that the bobbins 2 upon the spindles $a$ have received their full complement of yarns and that it is desired to displace them by empty ones or those on which it is desired to wind the yarn, the yarns are first slackened by any suitable means, after which the supports (or framework) are raised by the gear-wheels $f^2$ and racks $f'$, operated in the manner hereinbefore described, so as to bring same into the position indicated by Fig. 6, and at this time it is necessary that the lifter-rail $n$ should be raised to its highest position. To accomplish this, the cam $n'$ is mounted upon the shaft $f^3$ and during its rotation moves in a lateral direction a bowl $n^2$, mounted on the stud $n^3$, carried by the bar $n^4$, which operates the lifter-rail $n$ in the well-known manner. The mechanism carried by the bar $b'$ is then moved so that the clips occupy a position vertically over the spindles $a$, (see Fig. 5,) a slight tilting or oscillating movement being imparted to these parts in order that the caps 1 in the clips may always keep entirely clear of the top front rollers $r\ r'$, the thread-guide board $r^2$ being thrown back when the parts are to be moved from the position shown in Fig. 6 to that shown in Fig. 5. This is attained by means of the levers $o$, fulcrumed at $o'$ and operated by the rods $o^2$, nuts $o^3$ on which come into contact with the stationary projections $o^4$, mounted on the guides $f$, so as to raise the ends $o^5$ of the levers $o$. In this manner, on the shaft $c$ being advanced toward the spindles the projecting pieces $c^{10}$ will come in contact with and be raised by the parts $o^5$ of the levers $o$ and so be caused to assume the position illustrated by Fig. 5. Any threads which may be toward the front of the caps 1 are guided to the back of same during such advancing movement by the arms $b^6$, hinged at $b^7$ on the jaws of the clips $b$, one of such hinged arms $b^6$ being mounted on one jaw of each clip $b$, whereon it is held in its closed position by the spring $b^8$. The clips $b$ and other parts are now lowered by a reversal in the direction of rotation of the shaft $f^3$ to a position wherein on the jaws of the clips $b$ being released by the withdrawal from between them of the levers $c'$ the flanges $b^5$ therein take underneath the lower ends of the caps 1. The same movement of the rod $c$ to release the jaws of the clips $b$ also causes the fingers $d'$ to be moved laterally and so assume a position beneath the bobbins 2. Hence on the supports $f$ being again raised to the position indicated by Fig. 5 the clips $b$ and fingers $d'$ will raise the caps 1 and bobbins 2, the latter keeping their positions within the caps. The rod $c$ is now withdrawn to such a position that the full bobbins are vertically above the pegs $k^2$, at which time the rod $c$ is rotated sufficiently to cause the fingers $d$ to be withdrawn from supporting the bobbins 2, but not sufficient to cause the flanges $b^5$ to be withdrawn from supporting the caps 1. The parts are then moved over the pegs $h^2$, on which have been placed a supply of empty bobbins 3, and these latter are raised therein through the bar $h$ being operated by its racks $h'$ and wheels $k^3$, and at this time the rod $c$ is again operated so as to cause the fingers to be moved beneath the flanges on the bobbins 3. After this the pegs $h^2$ are lowered and the other parts returned to a position above the spindles, over which they are lowered until the caps and bobbins occupy their proper positions thereon. During this lowering movement the threads are guided or moved close up to the spindles by means of the bar $p$, having notches $p'$, in which rest the threads or yarns. The stud $p^2$ on said bar engages with the slot $p^3$ in the bracket $p^4$. Hence on the lowering of the bar $p$ along with the other parts it is also moved laterally, and thus causes the threads to assume their desired positions beneath the flanges of the empty bobbins 3. The clips $b$ are then drawn away from the spindles $a$, and at this time the threads which are toward the backs of the bobbins 3 are guided to the proper side of same by the opening of the hinged arms $b^6$, and at the same time the bobbins are rotated thereby until the pegs $a^2$ on the spindles take within the notches at the lower ends of the bobbins formed for their reception. During these latter movements the threads from the full bobbins 2 extend therefrom to the newly-applied empty bobbins 3, to which they are now secured, and these are severed simultaneously by means of the cutters $p^5$, which are mounted on the bar $p^6$ and which take over the notched bar $p$. The drawing Fig. 14 illustrates the parts in their proper relative positions just prior to the operation of the severing mechanism. On the further lowering of the framework $f$ the lever $s$, pivoted at $s'$ thereon, comes into contact with the hinged stop-piece $s^2$, mounted on the stationary guide $f^4$, thus causing the withdrawal of the end $s^3$ of said lever from the notch $p^8$ in the bar $p^6$ to allow the spring $s^4$ (connected to the lever-arm $p^9$) to move said bar $p^6$ laterally to cause the cutters $p^5$ to be moved over the notches $p'$, and thus sever the threads lying therein, or the rod $p^6$ may be moved in a lateral direction manually by means of the handle $p^7$. After this severing of the threads has been effected the bobbins are then ready to be started and the spinning, twisting, or doubling operations recommenced.

The bar $k$, supporting the full bobbins 2, may be raised into the position indicated by Fig. 6 in order that said bobbins may the more readily be removed from their pegs, and said bar is held in this position by means of the pawl $k^6$ engaging with the ratchet-wheel $k^7$ on the shaft $k^4$.

Guards or covers $q$ may be mounted upon the supports $q'$ in order that the parts beneath may be kept clean and out of the way of the operative.

Suitable weights are employed to counterbalance the movable parts whenever desired.

Instead of employing a rail $k$, having projections $k^2$ to receive the full bobbins 2, as above described, we may transfer them from their clips to any suitable equivalent thereof in connection with the devices for cutting the yarns or causing them to be broken during or after the performance of said functions.

The movements of the several devices hereinbefore described may be arranged to be effected automatically by the movements of one or other of the machine's prime motor parts. However, in accordance with our invention we preferably make use of such prime motor for transmitting the vertical movements to the supports $f$ and the lifter-rail $n$ alone, the advancing and receding movements of the clip-rail $b'$ and bobbin-rails $n$ and $k$ being effected manually by the devices illustrated by the several drawings.

Such being the nature and object of our invention, what we claim is—

1. In doffing apparatus for spinning machinery, a series of hinged clips as $b$ provided with lateral projections as $b^5$ for the purpose hereinbefore described, and cams adapted to enter between the arms of each pair of clips for operating the said clips, substantially as and for the purpose described.

2. In doffing apparatus for spinning and like machinery, a series of hinged clips as $b$ provided with hinged arms as $b^6$ for the purposes hereinbefore described, and means for operating same, in combination substantially as herein specified.

3. In doffing apparatus for spinning and like machinery, a series of hinged clips as $b$ provided with lateral projections as $b^5$ and hinged arms as $b^6$, and means for operating same, in combination substantially as herein specified.

4. In doffing apparatus for spinning and like machinery, a series of hinged clips as $b$, a bar as $d$ provided with fingers as $d'$ and means for operating same, in combination substantially as herein specified.

5. In doffing apparatus for spinning and like machinery, a series of hinged clips as $b$ the springs $b^4$ on which tend to keep the jaws in a closed position, a series of cam-shaped lever-arms as $c'$ for opening said jaws, and means for operating and adjusting the positions of same, in combination substantially as herein specified.

6. In doffing apparatus for spinning and like machinery, a series of hinged clips, means for operating same, a bar $d$ provided with fingers or projections $d'$ and means for operating same, consisting of the shaft $c$, having cam $d^3$, levers $d^5$ and $d^7$, the former having one end engaged by the cam $d^3$ and its other end connected to lever $d^7$, and the latter having its other end connected to the bar $d$.

7. In doffing apparatus for spinning and like machinery a series of hinged clips arranged to receive the caps and bobbins, supports for said clips, vertical and horizontal guides for said supports, the horizontal guides being at a right angle to the rail of the machine, and means for moving the supports along said guides, substantially as specified.

8. In doffing apparatus for spinning and like machinery a series of hinged spring-clips arranged to receive the caps and bobbins, supports for said clips, vertical and horizontal guides for said supports, the horizontal guides being at a right angle to the rail of the machine, means for moving the supports along said guides, and means for tilting the clips out of the way of the usual top front rollers and thread-guide board, substantially as specified.

9. In doffing apparatus for spinning and like machinery, a series of hinged spring-clips and parts in connection therewith for receiving and moving the caps and bobbins, a vertically-movable rail having pegs or projections for receiving the full bobbins, and means for operating same, in combination substantially as herein specified.

10. In doffing apparatus for spinning and like machinery, a series of hinged spring-clips and parts in connection therewith for receiving and moving the caps and bobbins, a rail having pegs or projections whereby the empty bobbins are raised within said clips, and means for operating same in combination substantially as herein specified.

11. In doffing apparatus for spinning and like machinery, a series of hinged spring-clips for receiving and moving the caps and bobbins, a rail having projections upon which the full bobbins are projected, means for moving said rail vertically and also around the fulcrum of the levers upon which it is mounted and means for holding it in its raised position in combination substantially as herein specified.

12. In doffing apparatus for spinning and like machinery, a series of hinged spring-clips arranged to receive and move the caps and bobbins, rails having independent pegs for receiving and moving the full bobbins and the empty bobbins respectively, and means for causing same to operate in combination substantially as herein specified.

13. In doffing apparatus for spinning and like machinery, a series of hinged spring-clips arranged to receive and move the caps and bobbins, means for operating same, and means for placing the threads or yarns in proper position relatively with the spindles, the last-mentioned means including spring-arms carried by the clips.

14. In doffing apparatus for spinning and like machinery, a series of spring-clips for receiving and moving the caps and bobbins, means for operating same, and means for causing the lifter-rail of the machine to be raised simultaneously with the raising of the parts carrying said clips, in combination substantially as herein specified.

15. In doffing apparatus for spinning and like machinery, a series of spring-clips for carrying the caps and bobbins, rails having independent projections for receiving the full bobbins and the empty bobbins respectively, mechanism for carrying the threads to their proper position in proximity with the spindles, thread-severing mechanism, and means whereby the several parts are operated in combination substantially as herein specified.

In testimony whereof we have affixed our signatures in presence of two witnesses.

ALFRED STELL.
GEORGE STELL.
JOHN STELL.

Witnesses:
JOHN WHITEHEAD,
PICKLES BAILEY.